US012719753B1

(12) United States Patent
Na

(10) Patent No.: US 12,719,753 B1
(45) Date of Patent: Aug. 25, 2026

(54) DYNAMIC NETWORK FUNCTION DEPLOYMENT OPTIMIZATION FOR RADIO-BASED NETWORKS

(71) Applicant: Amazon Technologies, Inc., Seattle, WA (US)

(72) Inventor: Zhenye Na, Milpitas, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 38 days.

(21) Appl. No.: 18/535,555

(22) Filed: Dec. 11, 2023

(51) Int. Cl.
*G06F 13/00* (2006.01)
*H04L 41/0806* (2022.01)
*H04L 41/0895* (2022.01)
*H04L 41/16* (2022.01)

(52) U.S. Cl.
CPC ...... *H04L 41/0895* (2022.05); *H04L 41/0806* (2013.01); *H04L 41/16* (2013.01)

(58) Field of Classification Search
CPC .. H04L 41/0895; H04L 41/0806; H04L 41/16
USPC ................................ 709/222, 221, 220, 201
See application file for complete search history.

(56) References Cited

U.S. PATENT DOCUMENTS 12,155,538 B2 * 11/2024 Ganguli .............. H04L 41/5025
12,333,327 B2 * 6/2025 Olmsted-Thompson .................... G06F 9/45558
2023/0327960 A1 * 10/2023 Ganguli .................. H04L 41/50 709/224
2023/0393879 A1 * 12/2023 Olmsted-Thompson .................... G06F 9/4881
2024/0129022 A1 * 4/2024 Rofougaran ....... H04B 7/15542

* cited by examiner

*Primary Examiner* — Kenneth R Coulter
(74) *Attorney, Agent, or Firm* — Perilla Knox & Hildebrandt LLP; Thomas B. Hildebrandt

(57) ABSTRACT

Disclosed are various embodiments for dynamic deployment optimization for network functions in radio-based networks. In one embodiment, a deployment specification for a network function in a radio-based network is received. A particular node is dynamically selected from a plurality of nodes in a cloud provider network for executing the network function. The network function is deployed for execution on the particular node according to the deployment specification.

20 Claims, 9 Drawing Sheets

DYNAMIC NETWORK FUNCTION DEPLOYMENT OPTIMIZATION FOR RADIO-BASED NETWORKS

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. Cells in the millimeter wave band will have a relatively small coverage area but will offer much higher throughput than 4G.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
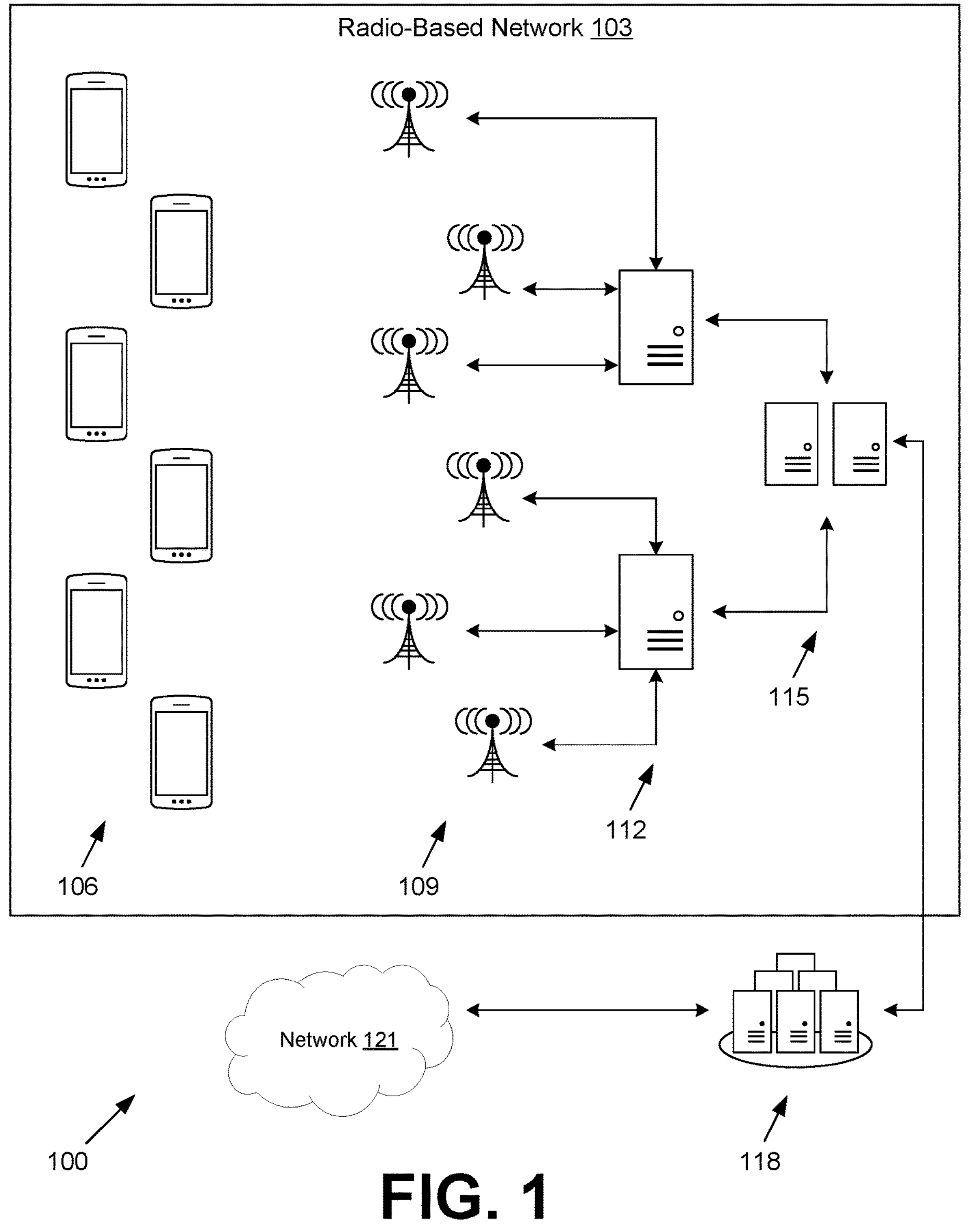
FIG. 1 is a drawing of an example of a communication network that is deployed and managed according to various embodiments of the present disclosure.

The present disclosure relates to dynamic network function deployment optimization for radio-based networks. As will be described, embodiments of the present disclosure allow for network functions in a radio-based network to be dynamically deployed (or redeployed) to an optimal deployment location. For example, the deployment location may be in a cloud provider network and may correspond to a cloud region, a local zone, an edge location, a cell site, or another location. In one scenario, the location corresponds to a specific container execution environment, such as a KUBERNETES cluster. The optimality of the deployment may consider a combination of various factors such as geographical or topological proximity, requirements of the network function, performance metrics associated with the location, cost, and/or other factors.

A radio-based network may comprise a cellular network such as a fourth-generation (4G) Long-Term Evolution (LTE) network, a fifth-generation (5G) network, a 4G-5G hybrid core with both 4G and 5G RANs, a sixth-generation (6G) network, or another network that provides wireless network access. Cellular network providers such as telecommunications companies ("telcos") deploy network functions to provide communication services to their customers. Network functions refer to the various components and services that make up a telecommunications network. Network functions are increasingly deployed using virtualization technologies such as Network Functions Virtualization (NFV) and Software-Defined Networking (SDN). This allows network functions to run as software on commodity hardware, providing flexibility and scalability. Virtualized network functions (VNFs) can also be easier to deploy and manage. For example, network providers can use Network Service Descriptors (NSDs) to define and plan network services, and leverage templates such as TOSCA (Topology and Orchestration Specification for Cloud Applications) templates to automate the deployment, scaling, and management of network functions specified in NSDs.

These service templates define "nodes," which refers to the fundamental building blocks or components that represent various entities in the network application. These nodes are used to describe the elements of the application's topology, including software components, services, and infrastructure resources, as well as the structure and relationships of the components in the application, along with their properties and requirements. A network orchestrator can interpret these templates and carry out the deployment and management of the specified nodes and their interconnections as defined in the templates.

Service templates can define various network functions which run on the geographically distributed hardware of the network. Distributed units (DUs) are computing devices that are typically deployed at cell sites of radio access networks (RANs) in radio-based networks. DUs operate at the lower layers of the RAN protocol stack, such as the Radio Link Control (RLC) sublayer, the Medium Access Control (MAC) sublayer, and the physical layer, depending on the particular implementation. This is in contrast to centralized units (CUs), which may be deployed at centralized locations and provide support for higher layers of the protocol stack, such as the Service Data Adaptation Protocol (SDAP), the Packet Data Convergence Protocol (PDCP), and the Radio Resource Control (RRC) protocol. Together, the DU and CU may correspond to the next generation node B (gNB) in fifth-generation (5G) networks, which enables user equipment (UEs) to connect to the core network. The DUs interface with one or more radio units (RUs) in order to communicate wirelessly with the UEs.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), and other functions.

Radio-based network deployments include multiple network functions that often require tedious manual configuration during deployment, maintenance, and failover procedures. Any downtime is unsatisfactory, as it leads to service downtime, service level agreement (SLA) violations, and a degraded user experience. However, manual reconfigurations in the case of a network failure typically require the physical presence of engineers and introduce a great overhead.

Rather than deploying network functions at fixed locations established in an NSD template, various embodiments of the present disclosure introduce the concept of dynamically locating the network functions within a cloud provider network to meet certain objectives. A cloud provider network may have a number of different nodes on which network functions may be executed for a radio-based network. As used herein, "node" refers to a potential deployment location, which may correspond to a computer system or a group of computer systems. In one example, the network functions may be containerized, and the node may correspond to a container execution environment such as a KUBERNETES cluster, which may span multiple computer systems. Nodes may be located in different regions, availability zones, and/or edge locations of the cloud provider network. As will be described, a decision engine may dynamically determine where to execute the network functions for the radio-based network based upon factors such as a network throughput analysis, geographic or topological proximity to a data source, performance monitoring, cost optimization, and so on.

As one skilled in the art will appreciate in light of this disclosure, certain embodiments may be capable of achieving certain advantages, including some or all of the following: (1) improving the functioning of a radio-based network by dynamically assigning network functions to locations that are near data sources or users, thereby reducing latency and/or improving throughput; (2) improving the functioning of a radio-based network by dynamically assigning network functions to locations based at least in part on interaction between the network functions, thereby improving throughput and/or reducing latency for control plane traffic between the network functions; (3) improving the configuration flexibility for a radio-based network by dynamically reassigning network functions to different locations based upon monitoring; (4) improving the operation of the radio-based network by dynamically matching resource-intensive network functions with nodes having adequate processing and memory resources; and so forth.

The radio-based network may use a core network infrastructure that may be provisioned dynamically and used in conjunction with one or more radio access networks operated by a cloud provider network and/or a plurality of communication service providers. The radio-based networks may also be scaled up or down or terminated dynamically. In various scenarios, an organization may create either a private radio-based network for internal use only or a radio-based network open to third-party customers using embodiments of the present disclosure.

Previous deployments of radio-based networks have relied upon manual deployment and configuration at each step of the process. This proved to be extremely time-consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer, such as a communication service provider, may dynamically scale its radio-based network based on utilization, latency requirements, and/or other factors.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques may provide edge location hardware (as described further below) integrated with network functions that run across the entire network, from cell sites to Internet break-outs, and orchestrate the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a cloud. While cloud native applications can be (and often are) run in the cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1, shown is an example of a communication network 100 that is deployed and managed according to various embodiments of the present disclosure. The communication network 100 includes a radio-based network (RBN) 103, which may correspond to a cellular network such as a 4G LTE network, a 5G network, a 4G-5G hybrid core with both 4G and 5G RANs, a 6G network, or another network that provides wireless network access. The radio-based network 103 may be operated by a cloud service provider for an enterprise, a non-profit, a school system, a governmental entity, a third-party communication service provider, or another organization. Alternatively, the radio-based network 103 may be operated by a communication service provider using resources of a cloud provider network.

Various deployments of the radio-based network 103 can include one or more of a core network and a RAN network, as well as a control plane for running the core and/or RAN network on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as user equipment (UE) or customer premises equipment (CPE).

The radio-based network 103 can include capacity provisioned on one or more RANs that provide the wireless network access to the plurality of wireless devices 106 through a plurality of cell sites 109. The RANs may be operated by a cloud network provider or different communication service providers. Each of the cell sites 109 may be equipped with one or more antennas and one or more radio units that send and receive wireless data signals to and from the wireless devices 106. As such, the RAN implements a radio access technology to enable radio connection with wireless devices 106 and provides connection with the radio-based network's core network. Components of the RAN include a base station and antennas that cover a given physical area, as well as required core network items for managing connections to the RAN. Core network functions can include a UPF, an SMF, an AMF, and/or other functions.

The UPF provides an interconnect point between the mobile infrastructure and the Data Network (DN), i.e., encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to general-purpose computing devices configured to perform the network functions. For example, the distributed computing devices 112 may execute one or more virtual machine instances and/or containers that are configured in turn to execute one or more services that perform the network functions. In one embodiment, the distributed computing devices 112 are ruggedized machines that are deployed at each cell site. The distributed computing devices 112 may be operated as an extension of a cloud provider network, with DU functions being executed, for example, by a container cluster upon the distributed computing devices 112. Further, the distributed computing devices 112 may be managed by the cloud provider network.

One or more centralized computing devices 115 may perform various network functions at a central site. For example, the centralized computing devices 115 may be centrally located on premises of the customer in a conditioned server room. The centralized computing devices 115 may execute one or more virtual machine instances that are configured in turn to execute one or more services that perform the network functions. In some cases, the centralized computing devices 115 may be located in a data center of a cloud provider network, rather than upon a customer's premises.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks. The core network sits between the RAN and external networks, such as the Internet and the public switched telephone network, and performs features such as authentication of UE, secure session management, user accounting, and handover of mobile UE between different RAN sites. As described herein, the core network functions typically performed by the core computing devices 118 may instead be performed by the distributed computing devices 112.

Collectively, the radio unit (RU), distributed unit (DU), and central unit (CU) convert the analog radio signal received from the antenna into a digital packet that can be routed over a network, and similarly they convert digital packets into radio signals that can be transmitted by the antenna. This signal transformation is accomplished by a sequence of network functions which can be distributed amongst the RU, DU, and CU in various ways to achieve different balances of latency, throughput, and network performance. These are referred to as "functional splits" of the RAN.

The network functions implemented in the RAN correspond to the lowest three network layers in the seven layer OSI model of computer networking. The physical Layer, PHY, or layer 1 (L1) is the first and lowest layer in the OSI model. In a radio-based network 103, the PHY is the layer that sends and receives radio signals. This can be split into two portions: a "high PHY" and "low PHY." Each of these can be considered a network function. The high PHY converts binary bits into electrical pulses that represent the binary data, and the low PHY then converts these electric pulses into radio waves to be transmitted wirelessly by the antennae. The PHY similarly converts received radio waves into a digital signal. This layer may be implemented by a specialized PHY chip.

The PHY interfaces with the data link layer-layer 2 (L2) in the OSI model. The primary task of the L2 is to provide an interface between the higher transport layers and the PHY. The 5G L2 has three sublayers: media access control (MAC), Radio Link Control (RLC), and Packet Data Convergence Protocol (PDCP). Each of these can be considered a network function. The PDCP provides security of radio resource control (RRC) traffic and signaling data, sequence numbering and sequential delivery of RRC messages and IP packets, and IP packet header compression. The RLC protocol provides control of the radio link. The MAC protocol maps information between logical and transport channels.

The data link layer interfaces with layer 3 (L3) in the OSI model, the network layer. The 5G L3 is also referred to as the Radio Resource Control (RRC) layer and is responsible for functions such as packet forwarding, quality of service management, and the establishment, maintenance, and release of a RRC connection between the UE and RAN.

Various functional splits can be chosen for a RAN. The functional splits define different sets of the L1 and L2 functions which are run on the RU versus on the CU and DU. The L3 is also run on the CU. In a RAN architecture following split 7, for example, the functionality of the baseband unit (BBU) used in previous wireless network generations is split into two functional units: the DU which is responsible for real time L1 and L2 scheduling functions, and the CU which is responsible for non-real time, higher L2 and L3 functions. By contrast, in a RAN architecture following split 2, for example, only the PDCP from L2 is handled by the DU and CU, while RLC, MAC, PHY, and radio-frequency signals (RF) are handled by the RU. In split 5, for example, the DU and CU handle PDCP, RLC, and part of the MAC functions, while the RU handles part of the MAC as well as PHY and RF. In split 6, for example, the DU and CU handle PDCP, RLC, MAC, and the RU handles only PHY and RF. In split 8, for example, the DU and CU handle PDCP, RLC, MAC, and PHY, while the RU handles just RF.

Figure 2A:
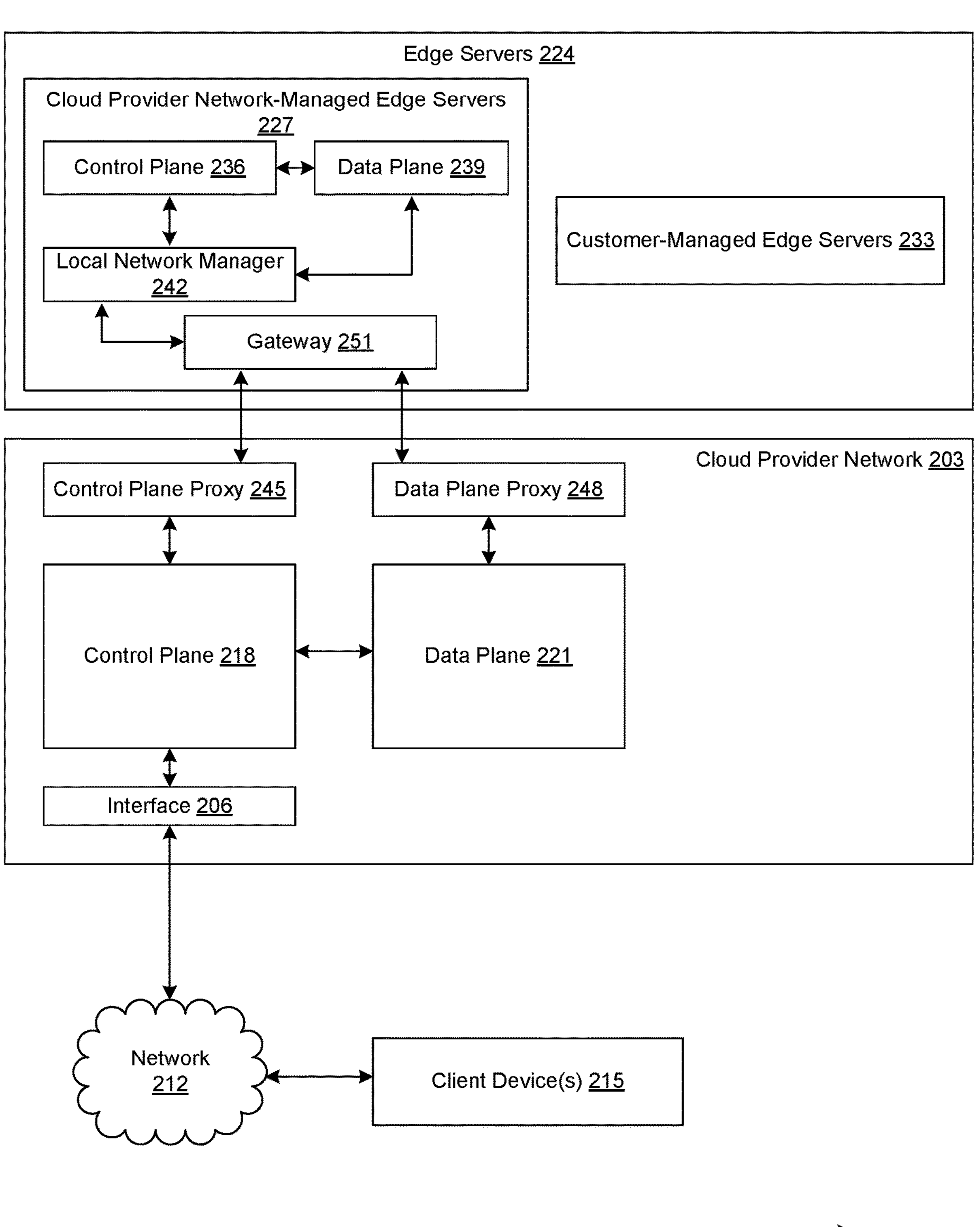
FIG. 2A illustrates an example of a networked environment including a cloud provider network and further including various edge servers of the cloud provider network according to some embodiments of the present disclosure.

FIG. 2A illustrates an example of a networked environment 200 including a cloud provider network 203 and further including various edge servers of the cloud provider network 203, which may be used in combination with on-premise customer deployments within the communication network 100 of FIG. 1, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. The cloud provider network 203 may correspond to a public cloud that provides services to external customers, or the cloud provider network 203 may correspond to a private cloud that provides services only to internal customers within an organization that operates or controls the private cloud.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and preloaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface 206 and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Block data is normally stored in a data buffer and read or written a whole block at a time. In general, a volume can correspond to a logical collection of data, such as a set of data maintained on behalf of a user. User volumes, which can be treated as an individual hard drive ranging for example from 1 gigabyte (GB) to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

An edge server 224 provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, an edge server 224 can be configured to provide capacity for cloud-based workloads to run within the telecommunications network. In some implementations, an edge server 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

As indicated, such edge servers 224 can include cloud provider network-managed edge servers 227 (e.g., formed by servers located in a facility such as a customer's premises or a cellular communication network separate from those associated with the cloud provider network 203 but where such servers are still managed by the cloud provider), customer-managed edge servers 233 (e.g., formed by servers located on-premise in a customer or partner facility), among other possible types of substrate extensions.

As illustrated in the example edge server 224, an edge server 224 can similarly include a logical separation between a control plane 236 and a data plane 239, respectively extending the control plane 218 and data plane 221 of the cloud provider network 203. The edge server 224 may be pre-configured, e.g. by the cloud provider network operator, with an appropriate combination of hardware with software and/or firmware elements to support various types of computing-related resources, and to do so in a manner that mirrors the experience of using the cloud provider network 203. For example, one or more edge server location servers can be provisioned by the cloud provider for deployment within an edge server 224. As described above, the cloud provider network 203 may offer a set of predefined instance types, each having varying types and quantities of underlying hardware resources. Each instance type may also be offered in various sizes. In order to enable customers to continue using the same instance types and sizes in an edge server 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the edge server location servers. This can improve utilization of computing resources within the edge location by allowing for better packing of running instances on servers, and also provides a seamless experience regarding instance usage across the cloud provider network 203 and the cloud provider network-managed edge server 227.

The edge servers can host one or more compute instances. Compute instances can be VMs, or containers that package up code and all its dependencies, so that an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at an edge server 224 than in the region, an optimal utilization experience may not be provided if the edge server 224 includes such dedicated block store servers. Accordingly, a block storage service may be virtualized in the edge server 224, such that one of the VMs runs the block store software and stores the data of a volume. Similar to the operation of a block storage service in the region of a cloud provider network 203, the volumes within an edge server 224 may be replicated for durability and availability. The volumes may be provisioned within their own isolated virtual network within the edge server 224. The compute instances and any volumes collectively make up a data plane 239 extension of the provider network data plane 221 within the edge server 224.

The servers within an edge server 224 may, in some implementations, host certain local control plane components, for example, components that enable the edge server 224 to continue functioning if there is a break in the connection back to the cloud provider network 203. Examples of these components include a migration manager that can move compute instances between edge servers if needed to maintain availability, and a key value data store that indicates where volume replicas are located. However, generally the control plane 236 functionality for an edge server 224 will remain in the cloud provider network 203 in order to allow customers to use as much resource capacity of the edge server 224 as possible.

Server software running at an edge server 224 may be designed by the cloud provider to run on the cloud provider substrate network, and this software may be enabled to run unmodified in an edge server 224 by using local network manager(s) 242 to create a private replica of the substrate network within the edge location (a "shadow substrate"). The local network manager(s) 242 can run on edge server 224 servers and bridge the shadow substrate with the edge server 224 network, for example, by acting as a virtual private network (VPN) endpoint or endpoints between the edge server 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the edge server 224 to seamlessly communicate with resources in the cloud provider network 203. In some implementations, a single local network manager 242 can perform these actions for all servers hosting compute instances in an edge server 224. In other implementations, each of the server hosting compute instances may have a dedicated local network manager 242. In multi-rack edge locations, inter-rack communications can go through the local network managers 242, with local network managers maintaining open tunnels to one another.

Edge server locations can utilize software-defined networking and secure networking tunnels through the edge server 224 network to the cloud provider network 203, for example, to maintain security of customer data when traversing the edge server 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in an edge server 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between an edge server 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of edge server 224. That is, CP proxies 245 provide infrastructure for tunneling management API traffic destined for edge servers out of the region substrate and to the edge server 224. For example, a virtualized computing service of the cloud provider network 203 can issue a command to a VMM of a server of an edge server 224 to launch a compute instance. A CP proxy 245 maintains a tunnel (e.g., a VPN) to a local network manager 242 of the edge server 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at an edge server 224 or may be able to manage control plane traffic for multiple servers in the same edge server.

A data plane (DP) proxy 248 can also be provisioned in the cloud provider network 203 to represent particular server(s) in an edge server 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span edge servers 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the edge server(s) and the cloud provider network 203. Data plane traffic flowing between an edge server 224 and the cloud provider network 203 can be passed through DP proxies 248 associated with that edge server 224. For data plane traffic flowing from an edge server 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to an edge server 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using edge server resources in a manner analogous to the way in which such commands would be issued with respect to compute instances hosted within the cloud provider network 203. From the perspective of the customer, the customer can now seamlessly use local resources within an edge server 224 (as well as resources located in the cloud provider network 203, if desired). The compute instances set up on a server at an edge server 224 may communicate both with electronic devices located in the same network, as well as with other resources that are set up in the cloud provider network 203, as desired. A local gateway 251 can be implemented to provide network connectivity between an edge server 224 and a network associated with the extension.

There may be circumstances that necessitate the transfer of data between the object storage service and an edge server 224. For example, the object storage service may store machine images used to launch VMs, as well as snapshots representing point-in-time backups of volumes. The object gateway can be provided on an edge server server or a specialized storage device, and provide customers with configurable, per-bucket caching of object storage bucket contents in their edge server 224 to minimize the impact of edge server-region latency on the customer's workloads. The object gateway can also temporarily store snapshot data from snapshots of volumes in the edge server 224 and then sync with the object servers in the region when possible. The object gateway can also store machine images that the customer designates for use within the edge server 224 or on the customer's premises. In some implementations, the data within the edge server 224 may be encrypted with a unique key, and the cloud provider can limit keys from being shared from the region to the edge server 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and an edge server bucket can be created (on the object store servers) to store snapshot data and machine image data using the edge server encryption key.

In the manner described above, an edge server 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones," "edge zones," or "distributed cloud edge zones" (due to being near to customer workloads at the "edge" of the network). An edge zone may be connected in various ways to a publicly accessible network such as the Internet, for example directly, via another network, or via a private connection to a region. Although typically an edge zone would have more limited capacity than a region, in some cases an edge zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1, the distributed computing devices 112 (FIG. 1), the centralized computing devices 115 (FIG. 1), and the core computing devices 118 (FIG. 1) may be implemented as edge servers 224 of the cloud provider network 203. The installation or siting of edge servers 224 within a communication network 100 can vary subject to the particular network topology or architecture of the communication network 100. Edge servers 224 can generally be connected anywhere the communication network 100 can break out packet-based traffic (e.g., IP based traffic). Additionally, communications between a given edge server 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of MEC. Such edge locations can be connected to various points within a 5G network that provide a breakout for data traffic as part of the UPF. Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between an edge server 224 and the cloud provider network 203 can be broken out of the communication network 100 without routing through the core network.

In some embodiments, edge servers 224 can be connected to more than one communication network associated with respective customers. For example, when two communication networks of respective customers share or route traffic through a common point, an edge server 224 can be connected to both networks. For example, each customer can assign some portion of its network address space to the edge server 224, and the edge server 224 can include a router or gateway 251 that can distinguish traffic exchanged with each of the communication networks 100. For example, traffic destined for the edge server 224 from one network might have a different destination IP address, source IP address, and/or virtual local area network (VLAN) tag than traffic received from another network. Traffic originating from the edge server 224 to a destination on one of the networks can be similarly encapsulated to have the appropriate VLAN tag, source IP address (e.g., from the pool allocated to the edge server 224 from the destination network address space) and destination IP address.

Figure 2B:
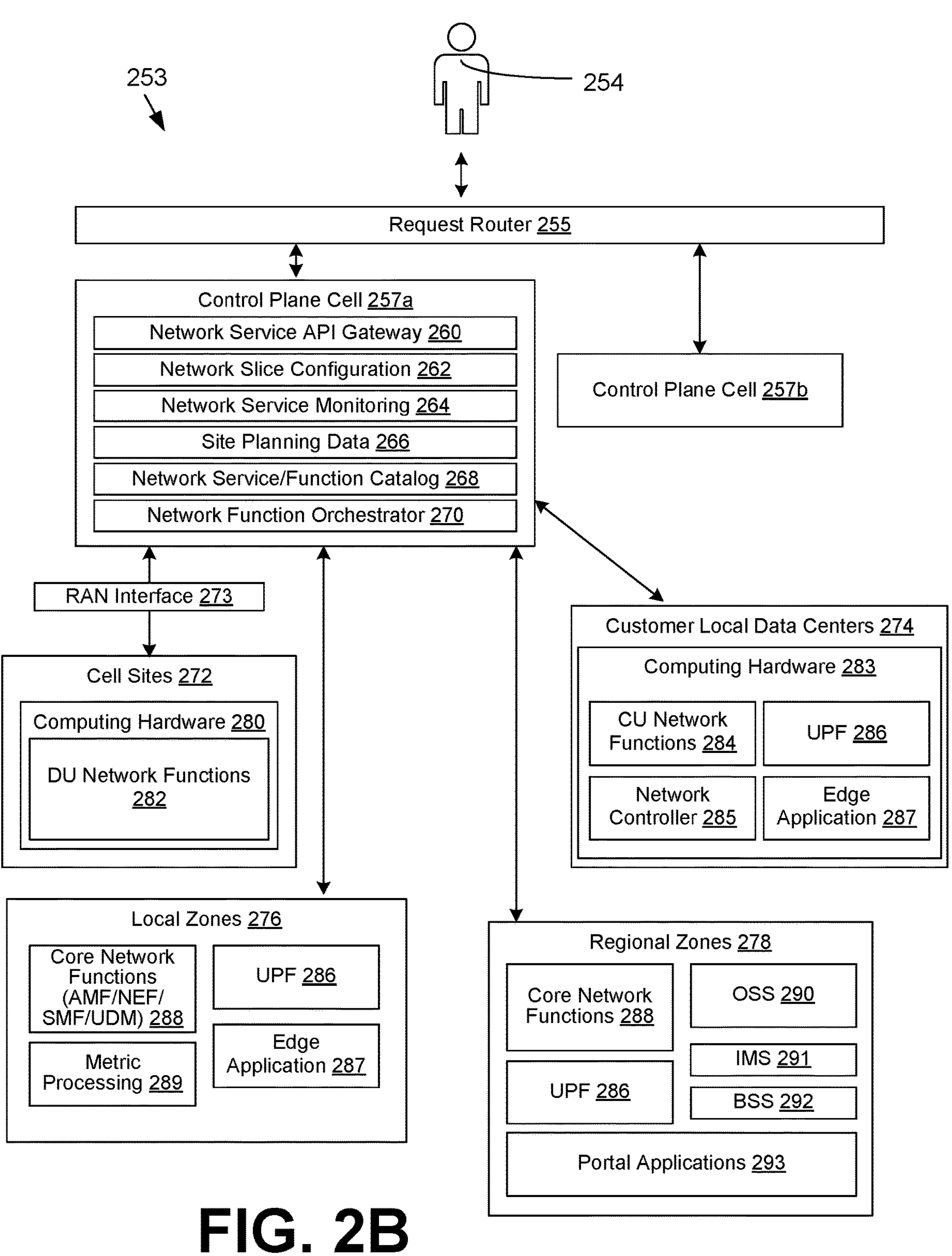
FIG. 2B depicts an example of cellularization and geographic distribution of the communication network of FIG. 1 according to one or more embodiments of the present disclosure.

FIG. 2B depicts an example 253 of cellularization and geographic distribution of the communication network 100 (FIG. 1) according to one or more embodiments. In FIG. 2B, a user device 254 communicates with a request router 255 to route a request to one of a plurality of control plane cells 257*a* and 257*b*. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instantiations and their supported services, allowing other NF instantiations to subscribe and be notified of registrations from NF instantiations of a given type. The NRF thus can support service discovery by receipt of discovery requests from NF instantiations, and details which NF instantiations support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1).

The control plane cell 257 may be in communication with one or more cell sites 272 by way of a RAN interface 273, one or more customer local data centers 274, one or more local zones 276, and one or more regional zones 278. The RAN interface 273 may include an application programming interface (API) that facilitates provisioning or releasing capacity in a RAN operated by a third-party communication service provider at a cell site 272. The cell sites 272 include computing hardware 280 that executes one or more distributed unit (DU) network functions 282. The customer local data centers 274 include computing hardware 283 (e.g., an edge server 224) that execute one or more central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287. In some implementations, such core network functions may be run on an edge server 224 which is more local to the edge server 224 running the DU/CU network functions 284, for example the same edge server 224 or another edge server 224 collocated at the same facility.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3:
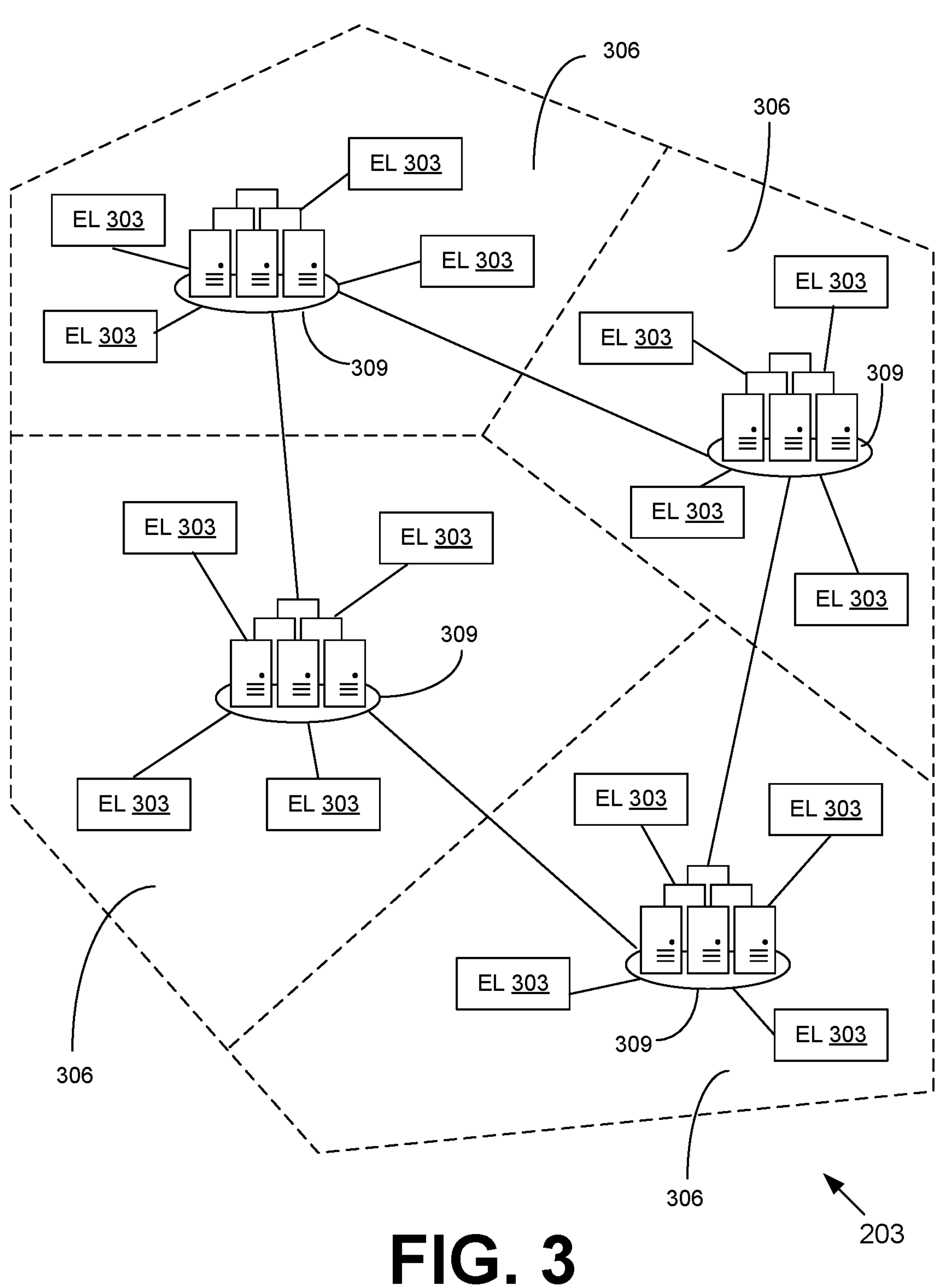
FIG. 3 illustrates an exemplary cloud provider network including geographically dispersed edge servers according to some embodiments of the present disclosure.

FIG. 3 illustrates an exemplary cloud provider network 203 including geographically dispersed edge servers 224 (FIG. 2A) (or "edge locations 303") according to some embodiments. As illustrated, a cloud provider network 203 can be formed as a number of regions 306, where a region 306 is a separate geographical area in which the cloud provider has one or more data centers 309. In some embodiments, the cloud provider network 203 may implement a software-defined network such as a virtual local area network or a virtual private cloud network on top of a physical communications network. Consequently, using software-defined networking, two physically distinct network segments may be combined into a single virtual network segment. Likewise, a subset of hosts on a physical network segment may be separated to different virtual network segment than other hosts on the physical network segment. In some cases, hosts may be on multiple virtual network segments simultaneously.

Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers or availability zones, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1), in some cases, such as when a cloud provider network facility is relatively close to a communications service provider facility, the edge location 303 can remain within the physical premises of the cloud provider network 203 while being connected to the communications service provider network via a fiber or other network link.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 4:
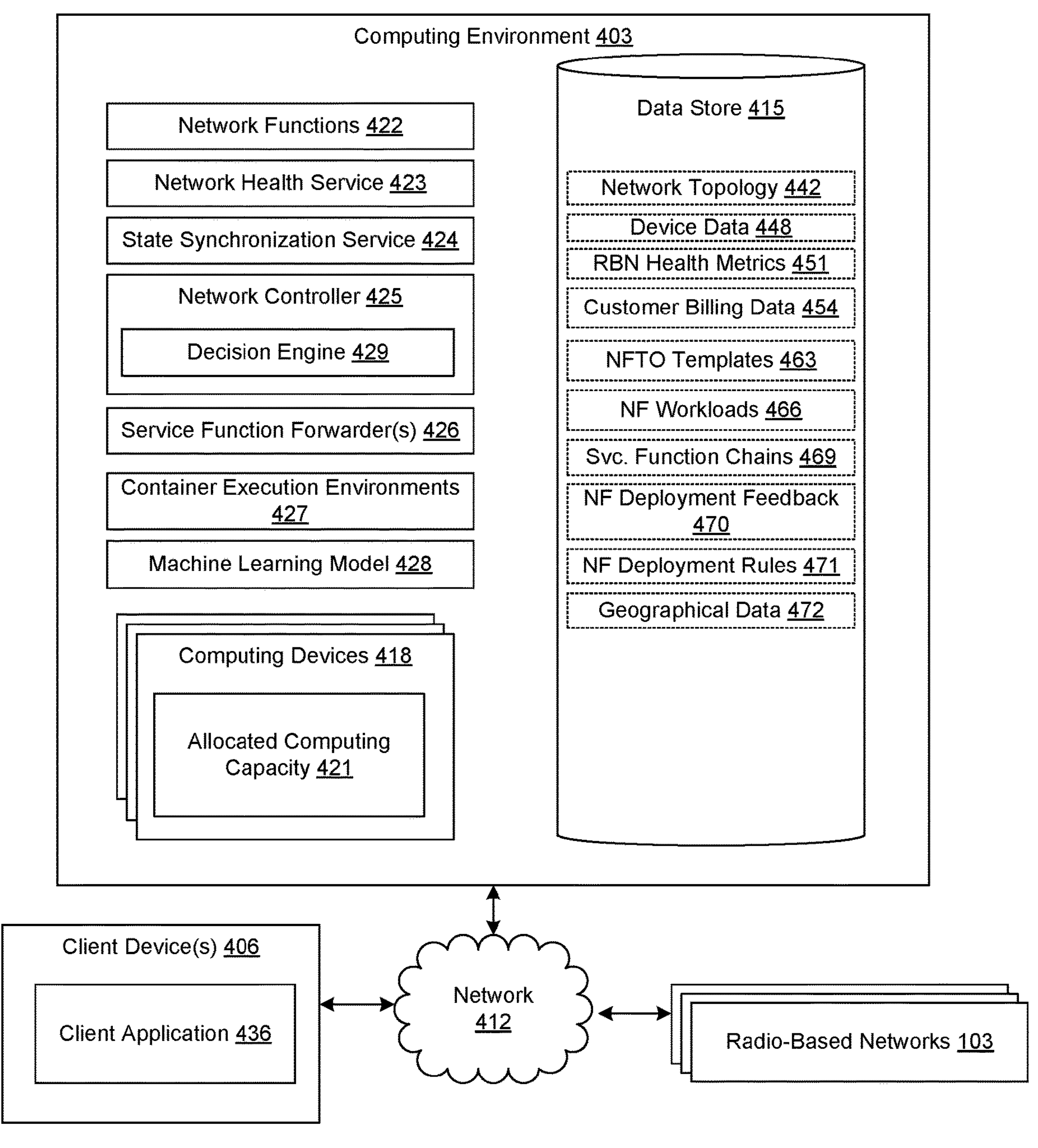
FIG. 4 is a schematic block diagram of a networked environment according to various embodiments of the present disclosure.

With reference to FIG. 4, shown is a networked environment 400 according to various embodiments. The networked environment 400 includes a computing environment 403, one or more client devices 406, and one or more radio-based networks 103, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203, where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes computing devices 418 and other types of computing devices. The computing devices 418 may correspond to different types of computing devices 418 and may have different computing architectures. The computing architectures may differ by utilizing processors having different architectures, such as x86, x86_64, ARM, Scalable Processor Architecture (SPARC), PowerPC, and so on. For example, some computing devices 418 may have x86 processors, while other computing devices 418 may have ARM processors. The computing devices 418 may differ also in hardware resources available, such as local storage, graphics processing units (GPUs), machine learning extensions, and other characteristics.

The computing devices 418 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of computing device 418 as opposed to other types of computing devices 418. In various examples, one VM instance may be executed singularly on a particular computing device 418, or a plurality of VM instances may be executed on a particular computing device 418. Also, a particular computing device 418 may execute different types of VM instances, which may offer different quantities of resources available via the computing device 418. For example, some types of VM instances may offer more memory and processing capability than other types of VM instances.

The components executed on the computing environment 403, for example, include one or more network functions 422, a network health service 423, a state synchronization service 424, a network controller 425, one or more service function forwarders 426, one or more container execution environments 427, one or more machine learning models 428, and other applications, services, processes, systems, engines, or functionality not discussed in detail herein.

The network functions 422 may correspond to various service functions implemented in a radio-based network 103, such as a 4G, 5G, or 6G network. In various examples, the network functions 422 may include one or more DU network functions 282 (FIG. 2B), one or more CU network functions 284 (FIG. 2B), one or more core network functions 288 (FIG. 2B) such as one or more UPFs 286 (FIG. 2B), and so on. In various embodiments, the network functions 422 themselves, or an environment in which they are executed, may be NSH-aware, such that the network functions 422 can decapsulate overlay network traffic that includes NSHs received from a service function forwarder 426 and add NSHs to encapsulate overlay network traffic before sending the network traffic to a service function forwarder 426. Non-limiting examples of network functions 422 may include an access and mobility management function, a session management function, a user plane function, a policy control function, an authentication server function, a unified data management function, an application function, a network exposure function, a network function repository, a network slice selection function, and/or others.

In various implementations, the network functions 422 may be deployed from customer-specific or vendor-specific network function versions or packages. These versions may be implemented in containers, machine instances, a code format used by a code execution service, and/or in other data formats. In some examples, the customer or operator of the radio-based network 103 may upload the network function version to the computing environment 403, or the customer or operator may select the network function version from a list of previously configured network function versions. As a non-limiting example, UPF versions may be available from a first vendor or a second vendor, and a UPF version may be specifically configured for a customer such as a communication service provider.

The network health service 423 may be executed to monitor the health and performance of the radio-based network 103. This may include receiving and analyzing metrics related to network links, networking components, and network functions 422. As such, the network health service 423 may be able to detect overload conditions and predict failures or service degradations. The network health service 423 may also detect when a network function 422 has become unresponsive, e.g., due to a failure of the network function 422 to respond to a health status check from the network health service 423, or when the network function 422 has failed to transmit an expected periodic health status update to the network health service 423. In some embodiments, the network health service 423 may utilize a hierarchy of health monitoring agents deployed in various components of the radio-based network 103, which may collect and aggregate health information for further processing by the network health service 423. In one implementation, the network health service 423 may utilize simple network management protocol (SNMP) to collect information from various components of the radio-based network 103. Ultimately, as a result of processing the collected health information, the network health service 423 may generate adverse health events for reporting to the network controller 425. In various implementations, the network health service 423 may retrieve performance metrics (e.g., relating to processor usage, network throughput, memory usage, latency, and so on) for the network functions 422 and/or the container execution environments 427.

The state synchronization service 424 is executed to maintain synchronization of network function state in a radio-based network 103. In this way, the state synchronization service 424 may exchange state synchronization messages with various RAN-enabled edge servers in a radio-based network 103, aggregate the messages, and develop a canonical copy of the DU state, CU state, and/or core state. Corresponding state synchronization agents may also be executed on the RAN-enabled edge servers to facilitate synchronization. In some cases, a centralized state synchronization service 424 is absent and replaced with the state synchronization agents on the RAN-enabled edge servers. By synchronizing or replicating network function state, a particular instantiation of a network function 422 can be seamlessly swapped out for another instantiation of the network function 422 and/or stateful load balancing may be implemented.

The network controller 425 may be executed to manage a radio-based network 103. In various embodiments, the network controller 425 may manage self-healing activities and resilience-building activities. The network controller 425 may also manage service function chaining and initiate modifications as appropriate to service function chains, e.g., to implement load balancing or service restoration activities.

The network controller 425 may include a decision engine 429 configured to implement dynamic network function deployment optimization. The decision engine 429 may incorporate an intelligent algorithm that assesses factors such as throughput requirements, geographical or topological proximity, and node performance. The decision engine 429 may be driven by rule-based logic to perform throughput analysis, incorporate locality consideration, and utilize performance monitoring in order to dynamically allocate or assign network functions 422 to nodes such as container execution environments 427. In various examples, the decision engine 429 may provide a customer with a recommendation with respect to deploying a network function 422 on a particular dynamically determined node, or the decision engine 429 may automatically implement deploying the network function 422 on the dynamically determined node.

The service function forwarders 426 are configured to route and forward network traffic (e.g., control plane network traffic) between a source (e.g., a UE or a radio unit) and other network functions 422 in a radio-based network 103. The operation of the service function forwarders 426 is configured to implement one or more service function chains, or chains of network functions 422 that are to process the network traffic. The service function forwarders 426 may determine a next-hop network function 422 based at least in part on a network service header added to the network traffic through encapsulation. Additional components involved in a system that implements service function chaining are described in U.S. patent application Ser. No. 18/066,072, entitled "SERVICE FUNCTION CHAINING IN RADIO-BASED NETWORKS, and filed on Dec. 14, 2022, which is incorporated herein by reference in its entirety. In some embodiments, service function forwarders 426 may be used to implement migration of a network function 422 from a first location to a second location in a seamless way. In other embodiments, such migration may be performed by a load balancer or elastic network interface entity.

The container execution environments 427 may correspond to KUBERNETES or other clusters used to execute containers. Within a cloud provider network 203, the container execution environments 427 may be deployed in different availability zones, different regional data centers for regions 306, or different edge locations 303 (such as, for example, cell sites and local zones).

The machine learning model 428 may be trained to support the decision engine 429 in determining to dynamically assign network functions 422 to particular locations or nodes for execution. For example, the machine learning model 428 may generate or update rules that control the dynamic deployment optimization of network functions 422. Feedback from customers, e.g., accepting or rejecting potential network function placements, may be used to further train the machine learning model 428. However, data from one customer is not used in training a machine learning model 428 for another customer unless the customer has elected to share the data for use in training the machine learning model 428.

The data stored in the data store 415 includes, for example, one or more network topologies 442, device data 448, one or more RBN health metrics 451, customer billing data 454, network function topology and orchestration templates 463, one or more network function workloads 466, one or more service function chains 469, network function deployment feedback 470, one or more network function deployment rules 471, geographical data 472, and potentially other data.

The network topology 442 may correspond to a logical topology of cells 109 in a radio-based network 103 used to cover a geographic area. The network topology 442 may include information about data communication links (e.g., latency and throughput) that connect cells 109 with each other and/or to the core network, which may be at least partially implemented on cloud provider network-infrastructure.

The device data 448 corresponds to data describing wireless devices 106 that are permitted to connect to the radio-based network 103. This device data 448 includes corresponding users, account information, billing information, data plans, permitted applications or uses, an indication of whether the wireless device 106 is mobile or fixed, a location, a current cell, a network address, device identifiers (e.g., International Mobile Equipment Identity (IMEI) number, Equipment Serial Number (ESN), Media Access Control (MAC) address, Subscriber Identity Module (SIM) number, etc.), and so on.

The RBN health metrics 451 include various metrics or statistics that indicate the performance or health of the radio-based network 103. Such RBN health metrics 451 may include bandwidth metrics, dropped packet metrics, signal strength metrics, latency metrics, throughput metrics, and so on. The RBN health metrics 451 may be aggregated on a per-device basis, a per-cell basis, a per-customer basis, etc.

The customer billing data 454 specifies charges that the customer is to incur for the operation of the radio-based network 103 for the customer by the provider. The charges may include fixed costs based upon equipment deployed to the customer and/or usage costs based upon utilization as determined by usage metrics that are tracked. In some cases, the customer may purchase the equipment up-front and may be charged only for bandwidth or backend network costs. In other cases, the customer may incur no up-front costs and may be charged purely based on utilization. With the equipment being provided to the customer based on a utility computing model, the cloud service provider may choose an optimal configuration of equipment in order to meet customer target performance metrics while avoiding overprovisioning of unnecessary hardware.

The network function topology and orchestration (NFTO) templates 463 correspond to templates that configure the deployment and/or operation of various network functions 422 for the radio-based network 103. In various embodiments, the network functions 422 may be deployed in VM instances or containers located in computing devices 418 that are at cell sites, at customer aggregation sites, or in data centers remotely located from the customer. In some examples, the network functions 422 represented in the NFTO templates 463 may be implemented in cloud infrastructure that spans multiple regions 306 and edge locations 303, such as local zones. The NFTO template 463 may specify locations for deployment of network functions 422, which may be overridden by the dynamically optimized assignments generated through the decision engine 429. In some embodiments, the NFTO templates 463 employ a grammar based upon Yet Another Markup Language (YAML), Extensible Markup Language (XML), JAVASCRIPT Object Notation (JSON), and/or Topology and Orchestration Specification for Cloud Applications (TOSCA).

TOSCA is an open standard from the Organization for the Advancement of Structured Information Standards (OASIS) that provides a structured way to define and manage cloud applications and their infrastructure. TOSCA offers templates for describing the components, relationships, properties, and deployment plans of cloud-based services. TOSCA simplifies the deployment, scaling, and orchestration of complex cloud applications by ensuring interoperability and portability across various cloud environments and automation tools. TOSCA serves as a foundation for creating, sharing, and automating cloud application blueprints.

In some embodiments, the NFTO templates 462 may use a grammar that is specific to, or contains enhancements directed to, a particular infrastructure environment. To illustrate, a version of TOSCA that is customized for elements of a particular cloud provider network 203 may be used. For example, a cloud provider network 203 may have proprietary infrastructures, services, types of resources, APIs, and so on. A version of TOSCA with modifications to describe these provider-specific elements may be employed in the NFTO templates 463.

The network function workloads 466 correspond to machine images, containers, or functions to be launched in the allocated computing capacity 421 or the container execution environments 427 to perform one or more of the network functions 422.

The service function chains 469 correspond to an ordered sequence of network functions 422 that are to process network traffic (e.g., control plane traffic and/or data plane traffic) for a particular source (e.g., a UE or a radio unit). The service function chains 469 may be implemented by the network controller 425 configuring one or more service function forwarders 426 to forward traffic associated with particular service function chains 469 to a next destination in the service function chain 469.

The network function deployment feedback 470 corresponds to feedback from customers operating a radio-based network 103 with respect to dynamically determined network function location assignments. In some cases, the decision engine 429 may generate a proposed location for a network function 422, which may be accepted or rejected by the customer. That the proposed location is accepted or rejected may go into the network function deployment feedback 470 which is used in training or teaching the machine learning model 428.

The network function deployment rules 471 may be manually curated or automatically generated to control the dynamic deployment of network functions 422 guided by the decision engine 429. In various examples, the network function deployment rules 471 may specify prioritizations of the customer as parameters. For example, a first customer may prioritize cost savings in deploying network functions 422, a second customer may prioritize reduction of latency or increased throughput, and a third customer may prioritize reliability or resiliency.

The geographical data 472 includes information of the geographical locations of container execution environment 427, the computing devices 418, cells 109, edge locations 303, and so forth. The geographical data 472 may be leveraged by the decision engine 429 to appropriately match network functions 422 to geographic locations that are proximate to a volume of end users or cell sites primarily used by the end users.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 436 and/or other applications. The client application 436 may be executed in a client device 406, for example, to access network content served up by the computing environment 403 and/or other servers, thereby rendering a user interface on the display. To this end, the client application 436 may comprise, for example, a browser, a dedicated application, etc., and the user interface may comprise a network page, an application screen, etc. The client device 406 may be configured to execute applications beyond the client application 436 such as, for example, email applications, social networking applications, word processors, spreadsheets, and/or other applications.

Figure 5:
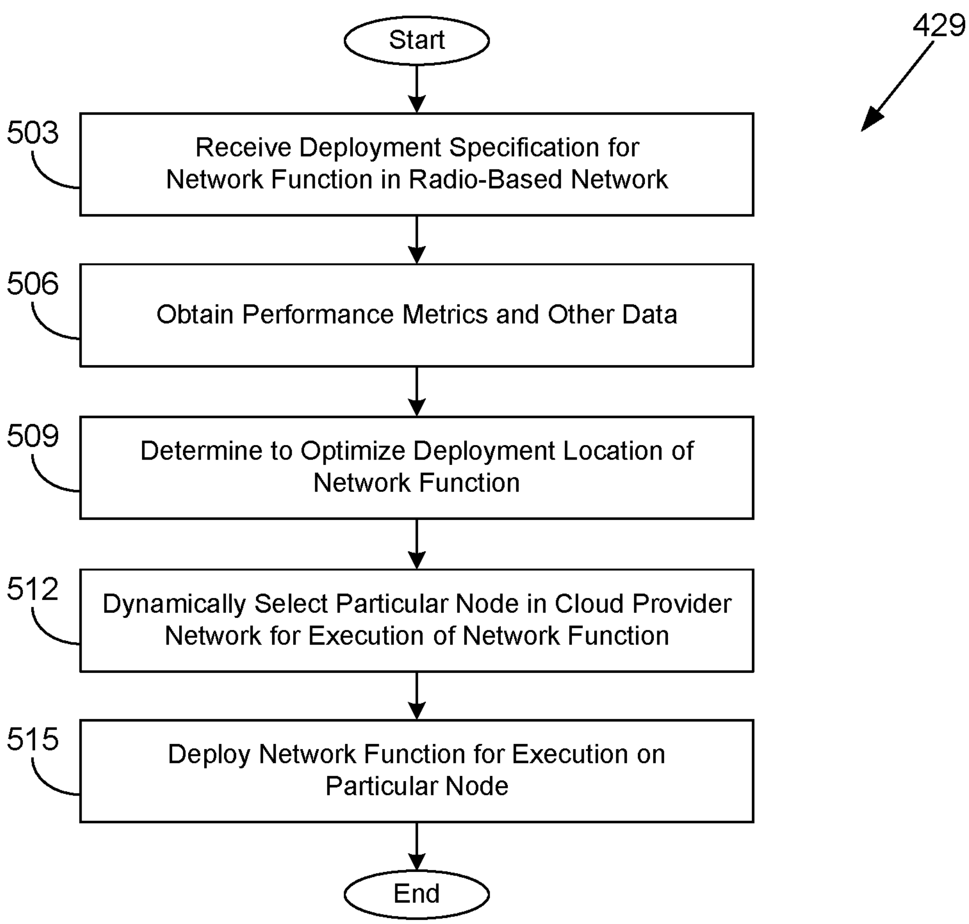
FIGS. 5-7 are flowcharts illustrating examples of functionality implemented as portions of a decision engine executed in a computing environment in the networked environment of FIG. 4 according to various embodiments of the present disclosure.

Referring next to FIG. 5, shown is a flowchart that provides one example of the operation of a portion of the decision engine 429 according to various embodiments. It is understood that the flowchart of FIG. 5 provides merely an example of the many different types of functional arrangements that may be employed to implement the operation of the portion of the decision engine 429 as described herein. As an alternative, the flowchart of FIG. 5 may be viewed as depicting an example of elements of a method implemented in the computing environment 403 (FIG. 4) according to one or more embodiments.

Beginning with box 503, the decision engine 429 receives a deployment specification for a network function 422 in a radio-based network 103. In one example, the deployment specification comprises an NFTO template 463, which may be in TOSCA or another format. The deployment specification may be manually created or automatically generated. Among other things, the deployment specification may specify a deployment location for the network function 422, which may correspond to a regional data center, an availability zone, a local zone, an edge location, or another location.

In box 506, the decision engine 429 obtains performance metrics and other data regarding the network function 422 and the nodes of a cloud provider network 203 on which the network function 422 may be executed. Such performance metrics may include processor utilization, memory utilization, throughput, latency, and so on. It is noted that the performance metrics may change over time. The decision engine 429 may receive metrics from monitoring throughput at the nodes, computing resource utilization at the nodes, and so on. The decision engine 429 may obtain data regarding the requirements in terms of throughput, latency, etc. for the specific version of the network function 422. The decision engine 429 may also collect data regarding usage of the radio-based network 103, to include distribution of the usage across a network topology or geography.

In box 509, the decision engine 429 determines to optimize the deployment location of the network function 422. In some cases, this may include determining a different deployment location than that which was specified in the deployment specification. The decision engine 429 determines to optimize the deployment location based at least in part on one or more criteria, as configured in the network function deployment rules 471. For example, the customer operating the radio-based network 103 may decide to optimize to minimize cost, to reduce latency, to maximize throughput, to optimize reliability, and so forth.

In box 512, the decision engine 429 dynamically selects a particular node out of a plurality of nodes in the cloud provider network 203 for execution of the network function 422. The particular node may be dynamically selected in order to meet the criteria specified in the network function deployment rules 471. The criteria may be evaluated based on the performance metrics and other data, which may change over time. Accordingly, the optimized deployment location for the network function 422 may also change over time. In one example, the criteria may specify a set of weight values to be applied to respective factors in a linear combination of multiple factors. For example, some customers may prioritize cost over geographic proximity, while other customers may prioritize performance over cost.

In one example, the nodes correspond to respective container execution environments 427, and the network function 422 is in a container. In another example, the nodes correspond to respective computing devices 418 on which network functions 422 corresponding to machine instances may be executed. In yet another example, the nodes correspond to respective code execution services on which the network functions 422 may be executed. The nodes may be located in different regional data centers, availability zones, local zones, edge locations, etc., in the cloud provider network 203.

Different nodes may have different utilization levels, with some trending toward poor performance and others delivering adequate performance. For example, some nodes may be relatively overutilized, while others may be relatively underutilized. Also, where nodes correspond to machine instance types, the particular node may be selected based at least in part on a machine instance type most appropriate to the requirements of the particular network function 422. For example, through a throughput analysis of the particular network function 422, the decision engine 429 may decide to place the network function 422 in a node group with more powerful or less powerful machine instances in order to meet the throughput requirements of the particular network function 422.

Some nodes may have additional throughput capacity, while others may be limited. Limitations may be due to existing utilization or hardware-based limitations. For example, edge servers 224 may have reduced computing resources available than regional data centers. Further, throughput and latency may be determined based at least in part on geographical or topological proximity between the node and the users of the network function 422. Such users may correspond to end users located at cell sites, or the users may be other network functions 422. For example, the particular node may be dynamically selected based at least in part on a geographic or topological proximity to one or more cell sites of the radio-based network 103. Such a selection would optimize deployment by placing the network functions 422 closer to the data source, thereby reducing latency. In some examples, proximity may be assessed based upon round-trip-times between the node and destinations, or between the node and a set of known locations. It is observed that two nodes that have similar round-trip-times to a set of known locations (e.g., root name servers) may be considered to be relatively near in the network.

In some scenarios, the particular node may be dynamically selected based at least in part on the location of the particular node and one or more data locality rules, such as data sovereignty rules, which may require that data remain within a certain jurisdiction. In some scenarios, the particular node may be dynamically selected based at least in part on a throughput requirement of the network function 422. In some scenarios, the particular node may be dynamically selected based at least in part on a cost associated with execution of the network function 422 on the particular node. In some cases, the particular node may be selected based at least in part on a machine learning model 428 that is taught or trained to dynamically select the particular node in order to meet the criteria.

In box 515, once a particular node is dynamically selected, the network function 422 is deployed for execution on the particular node. Other than the deployment location, the deployment of the network function 422 may occur as specified in the deployment specification. In some cases, the decision engine 429 may generate a new deployment specification that includes the particular node as the deployment location. As network conditions and workloads change, the decision engine 429 may continually reevaluate the distribution of network functions 422 across nodes. This dynamic allocation improves adaptability and resource utilization. Also, rule weights and thresholds may be dynamically adjusted to adapt to varying network requirements from customers. Thereafter, the operation of the portion of the decision engine 429 ends.

Figure 6:
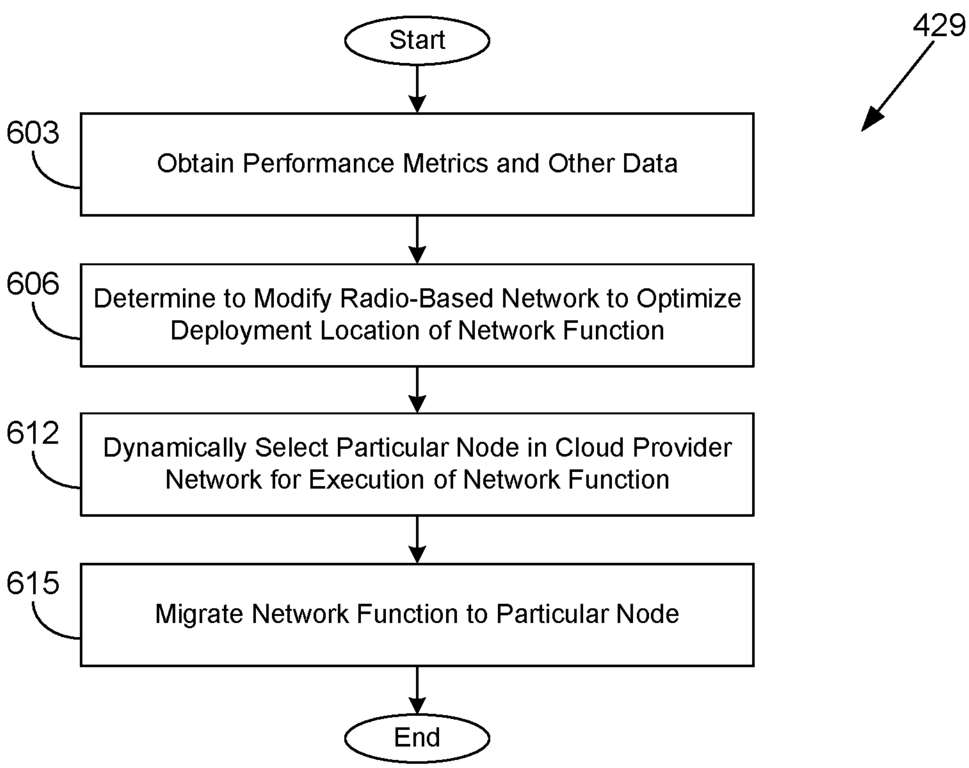

Turning now to FIG. 6, shown is a flowchart that provides one example of the operation of another portion of the decision engine 429 according to various embodiments. It is understood that the flowchart of FIG. 6 provides merely an example of the many different types of functional arrangements that may be employed to implement the operation of the portion of the decision engine 429 as described herein. As an alternative, the flowchart of FIG. 6 may be viewed as depicting an example of elements of a method implemented in the computing environment 403 (FIG. 4) according to one or more embodiments.

Beginning with box 603, the decision engine 429 obtains performance metrics and other data regarding a network function 422 and the nodes of a cloud provider network 203 on which the network function 422 may be executed. Such performance metrics may include processor utilization, memory utilization, throughput, latency, and so on. It is noted that the performance metrics may change over time. The decision engine 429 may receive metrics from monitoring throughput at the nodes, computing resource utilization at the nodes, and so on. The decision engine 429 may obtain data regarding the requirements in terms of throughput, latency, etc. for the specific version of the network function 422. The decision engine 429 may also collect data regarding usage of the radio-based network 103, to include distribution of the usage across a network topology or geography.

In box 606, the decision engine 429 determines to modify the radio-based network 103 to optimize the deployment location of the network function 422. For example, the existing deployment location may no longer be optimal due to updated information such as performance metrics or changed throughput/latency requirements of the network function 422. The decision engine 429 determines to optimize the deployment location based at least in part on one or more criteria, as configured in the network function deployment rules 471. For example, the customer operating the radio-based network 103 may decide to optimize to minimize cost, to reduce latency, to maximize throughput, to optimize reliability, and so forth.

In box 612, the decision engine 429 dynamically selects a particular node of a plurality of nodes in the cloud provider network 203 for execution of the network function 422. The particular node may be dynamically selected in order to meet the criteria specified in the network function deployment rules 471. The criteria may be evaluated based on the performance metrics and other data, which may change over time. Accordingly, the optimized deployment location for the network function 422 may also change over time, and the particular node may differ from the node on which the network function 422 is currently executed. In one example, the criteria may specify a set of weight values to be applied to respective factors in a linear combination of multiple factors. For example, some customers may prioritize cost over geographic proximity, while other customers may prioritize performance over cost.

In one example, the nodes correspond to respective container execution environments 427, and the network function 422 is in a container. In another example, the nodes correspond to respective computing devices 418 on which network functions 422 corresponding to machine instances may be executed. In yet another example, the nodes correspond to respective code execution services on which the network functions 422 may be executed. The nodes may be located in different regional data centers, availability zones, local zones, edge locations, etc., in the cloud provider network 203.

Different nodes may have different utilization levels, with some trending toward poor performance and others delivering adequate performance. For example, some nodes may be relatively overutilized, while others may be relatively underutilized. Also, where nodes correspond to machine instance types, the particular node may be selected based at least in part on a machine instance type most appropriate to the requirements of the particular network function 422. For example, through a throughput analysis of the particular network function 422, the decision engine 429 may decide to place the network function 422 in a node group with more powerful or less powerful machine instances in order to meet the throughput requirements of the particular network function 422.

Some nodes may have additional throughput capacity, while others may be limited. Limitations may be due to existing utilization or hardware-based limitations. For example, edge servers 224 may have reduced computing resources available than regional data centers. Further, throughput and latency may be determined based at least in part on geographical or topological proximity between the node and the users of the network function 422. Such users may correspond to end users located at cell sites, or the users may be other network functions 422. For example, the particular node may be dynamically selected based at least in part on a geographic or topological proximity to one or more cell sites of the radio-based network 103. Such a selection would optimize deployment by placing the network functions 422 closer to the data source, thereby reducing latency. In some examples, proximity may be assessed based upon round-trip-times between the node and destinations, or between the node and a set of known locations. It is observed that two nodes that have similar round-trip-times to a set of known locations (e.g., root name servers) may be considered to be relatively near in the network.

In some scenarios, the particular node may be dynamically selected based at least in part on the location of the particular node and one or more data locality rules, such as data sovereignty rules, which may require that data remain within a certain jurisdiction. In some scenarios, the particular node may be dynamically selected based at least in part on a throughput requirement of the network function 422. In some scenarios, the particular node may be dynamically selected based at least in part on a cost associated with execution of the network function 422 on the particular node. In some cases, the particular node may be selected based at least in part on a machine learning model 428 that is taught or trained to dynamically select the particular node in order to meet the criteria.

In box 615, the decision engine 429 causes the network function 422 to be migrated to the particular node determined in box 612. One goal may be to avoid any downtime, which may involve migration using service function chaining and the service function forwarder 426 (or a load balancers) to seamlessly redirect network traffic to the moved network function 422. This may also involve migrating state from the previous network function 422 location to the new network function 422 location using the state synchronization service 424. Thereafter, the operation of the portion of the decision engine 429 ends.

Figure 7:
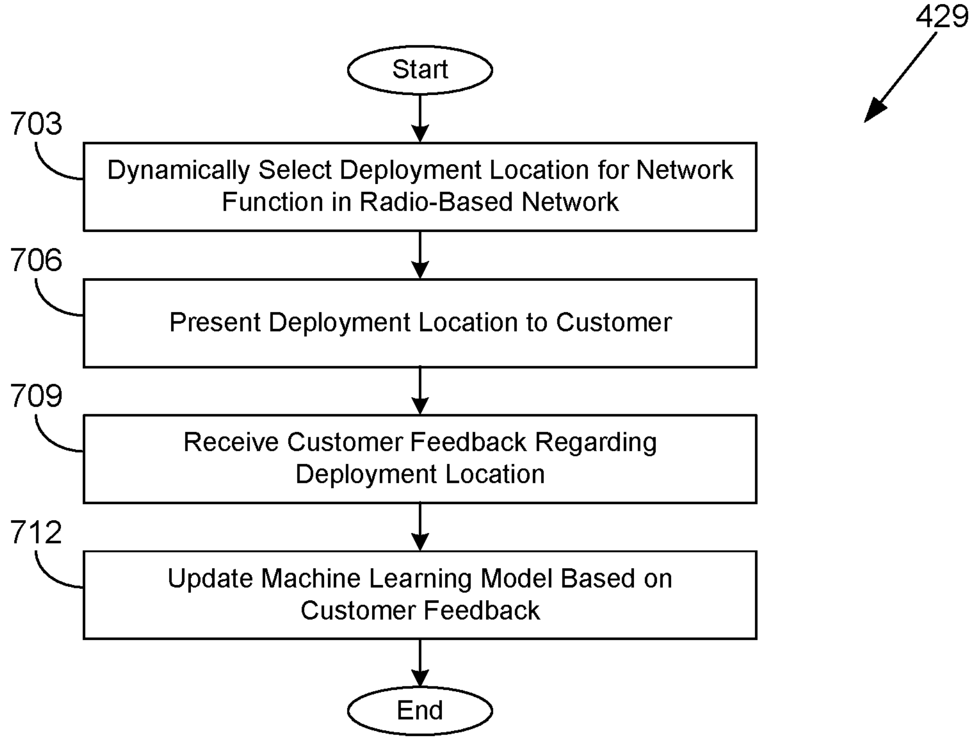

Moving to FIG. 7, shown is a flowchart that provides one example of the operation of another portion of the decision engine 429 according to various embodiments. It is understood that the flowchart of FIG. 7 provides merely an example of the many different types of functional arrangements that may be employed to implement the operation of the portion of the decision engine 429 as described herein. As an alternative, the flowchart of FIG. 7 may be viewed as depicting an example of elements of a method implemented in the computing environment 403 (FIG. 4) according to one or more embodiments.

Beginning with box 703, the decision engine 429 dynamically selects a deployment location for a network function 422 in a radio-based network 103. For example, the deployment location may correspond to a particular node of a plurality of nodes in the cloud provider network 203. The particular node may be dynamically selected in order to meet the criteria specified in the network function deployment rules 471. The criteria may be evaluated based on the performance metrics and other data, which may change over time. Accordingly, the optimized deployment location for the network function 422 may also change over time, and the particular node may differ from the node on which the network function 422 is currently executed. In one example, the criteria may specify a set of weight values to be applied to respective factors in a linear combination of multiple factors. For example, some customers may prioritize cost over geographic proximity, while other customers may prioritize performance over cost.

In one example, the nodes correspond to respective container execution environments 427, and the network function 422 is in a container. In another example, the nodes correspond to respective computing devices 418 on which network functions 422 corresponding to machine instances may be executed. In yet another example, the nodes correspond to respective code execution services on which the network functions 422 may be executed. The nodes may be located in different regional data centers, availability zones, local zones, edge locations, etc., in the cloud provider network 203.

Different nodes may have different utilization levels, with some trending toward poor performance and others delivering adequate performance. For example, some nodes may be relatively overutilized, while others may be relatively underutilized. Also, where nodes correspond to machine instance types, the particular node may be selected based at least in part on a machine instance type most appropriate to the requirements of the particular network function 422. For example, through a throughput analysis of the particular network function 422, the decision engine 429 may decide to place the network function 422 in a node group with more powerful or less powerful machine instances in order to meet the throughput requirements of the particular network function 422.

Some nodes may have additional throughput capacity, while others may be limited. Limitations may be due to existing utilization or hardware-based limitations. For example, edge servers 224 may have reduced computing resources available than regional data centers. Further, throughput and latency may be determined based at least in part on geographical or topological proximity between the node and the users of the network function 422. Such users may correspond to end users located at cell sites, or the users may be other network functions 422. For example, the particular node may be dynamically selected based at least in part on a geographic or topological proximity to one or more cell sites of the radio-based network 103. Such a selection would optimize deployment by placing the network functions 422 closer to the data source, thereby reducing latency. In some examples, proximity may be assessed based upon round-trip-times between the node and destinations, or between the node and a set of known locations. It is observed that two nodes that have similar round-trip-times to a set of known locations (e.g., root name servers) may be considered to be relatively near in the network.

In some scenarios, the particular node may be dynamically selected based at least in part on the location of the particular node and one or more data locality rules, such as data sovereignty rules, which may require that data remain within a certain jurisdiction. In some scenarios, the particular node may be dynamically selected based at least in part on a throughput requirement of the network function 422. In some scenarios, the particular node may be dynamically selected based at least in part on a cost associated with execution of the network function 422 on the particular node. In some cases, the particular node may be selected based at least in part on a machine learning model 428 that is taught or trained to dynamically select the particular node in order to meet the criteria.

In box 706, the decision engine 429 may present the deployment location determined in box 703 to a customer that operates the radio-based network 103. For example, the deployment location may be presented in a user interface, network page, email, mobile notification, text message, etc. The presentation of the deployment location may be configured to elicit a response from the customer of approval or rejection of the deployment location. The presentation may take the form of a notification of a proposed modification to the radio-based network 103. In one example, movement of the user base may necessitate network functions 422 be moved nearer to different cell sites in the radio-based network 103. In another example, utilization of the radio-based network 103 may have increased, thereby necessitating a higher performance node for executing the network function 422. In still another example, utilization on the current node may have increased, leading to reduced performance on the current node.

In box 709, the decision engine 429 receives customer feedback regarding the deployment location. This network function deployment feedback 470 may correspond to an approval or a rejection of the deployment location via the client application 436. In some cases, the decision engine 429 may cause the network function 422 to be automatically migrated to the new deployment location in response to receiving the approval from the customer. In box 712, the decision engine 429 may update the machine learning model 428 based upon the feedback received. In this way, the machine learning model 428 and the network function deployment rules 471 may be refined to make selections of deployment locations that are more acceptable to customers. Thereafter, the operation of the portion of the decision engine 429 ends.

Figure 8:
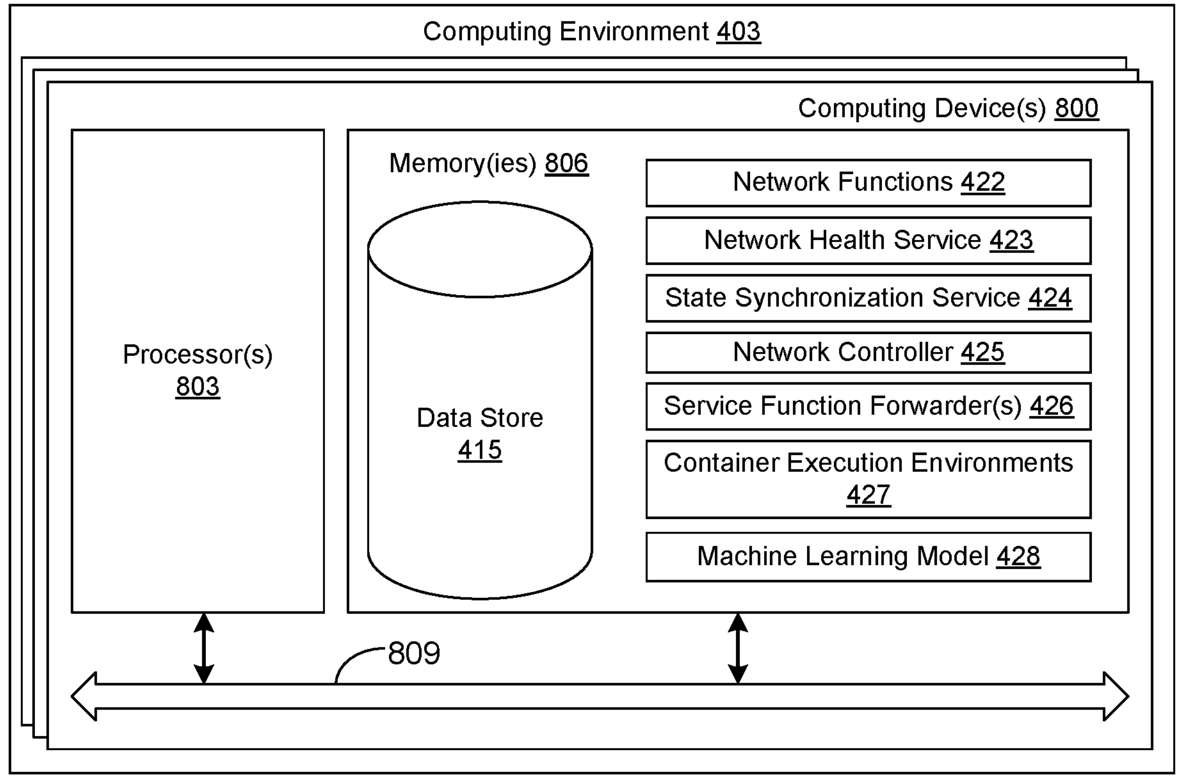
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the network functions 422, the network health service 423, the state synchronization service 424, the network controller 425, the service function forwarders 426, the container execution environments 427, the machine learning model 428, and potentially other applications. Also stored in the memory 806 may be a data store 415 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, universal serial bus (USB) flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although network functions 422, the network health service 423, the state synchronization service 424, the network controller 425, the service function forwarders 426, the container execution environments 427, the machine learning model 428, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5-7 show the functionality and operation of an implementation of portions of the decision engine 429. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including network functions 422, the network health service 423, the state synchronization service 424, the network controller 425, the service function forwarders 426, the container execution environments 427, or the machine learning model 428, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including network functions 422, the network health service 423, the state synchronization service 424, the network controller 425, the service function forwarders 426, the container execution environments 427, or the machine learning model 428, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 403.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:

a radio-based network deployed at least partially on infrastructure of a cloud provider network; and a computing device configured to at least:

receive a deployment specification for a network function in the radio-based network, the network function being implemented in a container;

determine to optimize a deployment location of the network function in the radio-based network for one or more criteria;

dynamically select a particular container execution environment from a plurality of container execution environments in the cloud provider network for executing the network function based at least in part on the particular container execution environment meeting the one or more criteria; and deploy the network function for execution in the particular container execution environment according to the deployment specification.

2. The system of claim 1, wherein the network function is at least one of: a user plane function or a distributed unit (DU) network function.

3. The system of claim 1, wherein the deployment specification specifies another deployment location that differs from the particular container execution environment that is selected.

4. The system of claim 1, wherein the computing device is further configured to at least monitor throughput at individual ones of the plurality of container execution environments, and the one or more criteria includes a throughput criterion.

5. The system of claim 1, wherein the computing device is further configured to at least monitor computing resource utilization at individual ones of the plurality of container execution environments, and the one or more criteria includes a computing resource utilization criterion.

6. The system of claim 1, wherein the computing device is further configured to at least teach a machine learning model to dynamically select the particular container execution environment in order to meet the one or more criteria.

7. A computer-implemented method, comprising:

receiving a deployment specification for a network function in a radio-based network;

dynamically selecting a particular node from a plurality of nodes in a cloud provider network for executing the network function;

deploying the network function for execution on the particular node according to the deployment specification;

dynamically selecting a different node from the plurality of nodes based at least in part on updated information; and migrating the network function for execution on the different node instead of the particular node.

8. The computer-implemented method of claim 7, wherein the particular node is in an edge location of the cloud provider network.

9. The computer-implemented method of claim 7, wherein the particular node is in a region data center of the cloud provider network.

10. The computer-implemented method of claim 7, wherein the network function corresponds to a container, and individual nodes of the plurality of nodes correspond to respective container execution environments.

11. The computer-implemented method of claim 7, wherein the particular node is dynamically selected based at least in part on a machine instance type corresponding to the particular node.

12. The computer-implemented method of claim 7, wherein the particular node is dynamically selected based at least in part on at least one of: a geographic proximity or a topological proximity to one or more cell sites of the radio-based network.

13. The computer-implemented method of claim 7, wherein the particular node is dynamically selected based at least in part on a location of the particular node and one or more data locality rules associated with the radio-based network.

14. The computer-implemented method of claim 7, wherein the particular node is dynamically selected based at least in part on one or more performance metrics of the particular node.

15. The computer-implemented method of claim 7, wherein the particular node is dynamically selected based at least in part on a throughput requirement of the network function.

16. The computer-implemented method of claim 7, wherein the particular node is dynamically selected based at least in part on a cost associated with execution of the network function on the particular node.

17. A computer-implemented method, comprising:

determining to modify a radio-based network to optimize a deployment location of a network function in the radio-based network, the network function being deployed on a first node of a plurality of nodes in a cloud provider network;

dynamically selecting a second node from the plurality of nodes for executing the network function;

sending a notification of a proposed modification to an operator of the radio-based network;

receiving an approval of the proposed modification from the operator; and migrating the network function from the first node to the second node in response to receiving the approval from the operator.

18. The computer-implemented method of claim 17, further comprising monitoring performance metrics for the plurality of nodes, wherein determining to modify the radio-based network is based at least in part on the performance metrics.

19. The computer-implemented method of claim 17, wherein the network function corresponds to a container, and individual nodes of the plurality of nodes correspond to respective container execution environments.

20. The computer-implemented method of claim 17, further comprising:

dynamically selecting a third node from the plurality of nodes based at least in part on updated information; and migrating the network function for execution from the second node to the third node.

* * * * *